United States Patent [19]

Foltz

[11] Patent Number: 4,896,510
[45] Date of Patent: Jan. 30, 1990

[54] COMBUSTOR LINER COOLING ARRANGEMENT

[75] Inventor: Howard L. Foltz, Westchester, Ohio
[73] Assignee: General Electric Company, Cincinnati, Ohio
[21] Appl. No.: 316,560
[22] Filed: Feb. 27, 1989

Related U.S. Application Data

[63] Continuation of Ser. No. 11,818, Feb. 6, 1987, abandoned.
[51] Int. Cl.$^4$ ............................................. F23R 3/54
[52] U.S. Cl. ........................................ 60/757; 60/760
[58] Field of Search .................. 60/752, 758, 757, 759, 60/760, 755, 754; 415/128, 115, 168.1, 121.2

[56] References Cited

U.S. PATENT DOCUMENTS

| | | | |
|---|---|---|---|
| 3,501,900 | 3/1970 | Warner et al. | 415/168 |
| 3,845,620 | 11/1974 | Kenworthy . | |
| 3,918,835 | 11/1975 | Yamarik et al. | 416/95 |
| 4,104,874 | 8/1978 | Caruel et al. . | |
| 4,201,047 | 5/1980 | Warren et al. | 60/755 |
| 4,259,842 | 4/1981 | Koshoffer et al. | 60/757 |
| 4,265,646 | 5/1981 | Weinstein et al. | 55/306 |
| 4,288,983 | 9/1981 | O'Rourke, Jr. | 60/226 R |
| 4,446,693 | 5/1984 | Pidcock et al. | 60/39.32 |
| 4,463,552 | 8/1984 | Monhardt et al. | 60/226.1 |
| 4,485,630 | 12/1984 | Kenworthy | 60/757 |
| 4,566,280 | 1/1986 | Burr | 60/757 |
| 4,567,730 | 2/1986 | Scott | 60/757 |
| 4,685,942 | 8/1987 | Klassen et al. | 55/306 |

OTHER PUBLICATIONS

NASA CR-159656, "Advanced Low-Emissions Catalytic Combustor Program Phase I Final Report", by G. J. Sturgess, pp. cover, 1; 75-76;125-128; and 141 and 142.

Primary Examiner—Louis J. Casaregola
Assistant Examiner—Timothy S. Thorpe
Attorney, Agent, or Firm—Jerome C. Squillaro; Steven J. Rosen

[57] ABSTRACT

A shield is disposed in spaced relationship to the exterior surface of the combustor liner of a gas turbine engine and extends over a plurality of very small holes formed in the combustor liner so as to block flow of air to these holes. Further, the shield provides a space between the shield and the combustor liner for receiving reverse flow of air. A portion of the air flowing along the exterior surface of the combustor liner is diverted for reverse flow in the path provided between the shield and the combustor liner. A lesser plurality of substantially larger holes are provided in the combustor liner at the point of reversal of the air so that the dirt particles in the air, because of the centrifugal force acting thereon, tend to flow through these larger holes. A second group of larger holes are provided in the combustor liner approximately at the forward end of the space between the shield and the combustor liner. In flowing to the very small holes in the combustor liner the air must make a second reversal and substantially all of any remaining dirt particles are caused to flow through this second group of larger holes during this second reversal of air flow. Accordingly, the air reaching the very small holes in the combustor liner and being directed to the interior surface of the combustor liner for cooling thereof is substantially devoid of dirt particles and the possibility of plugging any of these very small holes is minimized.

10 Claims, 1 Drawing Sheet

COMBUSTOR LINER COOLING ARRANGEMENT

This is a continuation of application Ser. No. 011,818 filed Feb. 6, 1987, now abandoned.

BACKGROUND OF THE INVENTION

This invention relates to gas turbine engines, and more particularly to arrangements for cooling the combustor liners of gas turbine engines.

In gas turbine engines energy is supplied by burning fuel in a combustor or combustion chamber. Fuel is supplied through a fuel nozzle at one end of the combustor, mixed with air and burned. The liner of the combustor is heated by radiation from the flame of the burning fuel and by convection as the combustion gases flow along the liner. In order to prevent excessive temperature of the liner it is conventional to provide a flow of relatively cool air along the exterior of the combustor. Further, holes or other passages have been provided in the wall of the combustor liner causing a portion of the cooling air flowing past the exterior of the combustor to be directed as a film along the interior wall of the combustor liner, so that cooling is provided both for the exterior and the interior of the combustor liner.

One arrangement for cooling the interior surface of the combustor liner is to provide a very large number of very small holes drilled in the combustor wall at an angle of about 20° so that air diverted from the exterior of the combustor through these holes is directed along the interior surface of the liner. These holes are laser-drilled and have a diameter of only about 0.02 inch. A very large number of such very small holes are employed in order to provide adequate and uniform cooling air for the interior surface of the liner. In one specific gas turbine engine about 40,000 such holes are drilled. This large number of holes spaced at frequent intervals over the wall of the combustor causes the cooling air to flow as a film over substantially all of the interior surface of the liner providing very effective cooling.

However, there is one serious problem with this approach to combustor liner cooling. Because of the very small size of the holes, dirt particles in the cooling air may plug a significant number of holes, reducing the flow of the cooling air therethrough and providing inadequate and uneven cooling of the interior surface of the combustor liner.

By the present invention, this problem has been greatly reduced. Provision is made for removing from the air, before it reaches these small holes, substantially all of the dirt particles of a size sufficient to constitute a reasonable possibility of plugging the small holes. Thus, by this invention, the possibility of plugging the holes and blocking the passage of cooling air to the interior surface of the combustor liner is greatly reduced and more effective cooling of this surface is provided.

Accordingly, it is an object of this invention to remove dirt particles from the cooling air being supplied to the interior surface of the combustor liner so as to prevent these particles from plugging very small holes provided in the liner wall for passage of cooling air.

SUMMARY OF THE INVENTION

In carrying out this invention, in one form thereof a shield is disposed in spaced relationship to the exterior surface of the combustor liner and extends over a plurality of very small holes formed in the combustor liner so as to block direct flow of air to these holes. Further, the shield provides a space between the shield and the combustor liner for receiving reverse flow of air. A portion of the air flowing along the exterior surface of the combustor liner is diverted for reverse flow in the path provided between the shield and the combustor liner. A lesser plurality of substantially larger holes are provided in the combustor liner at the point of reversal of the air so that the dirt particles in the air, because of the centrifugal force acting thereon, tend to flow through these larger holes. A second group of larger holes are provided in the combustor liner approximately at the forward end of the space between the shield and the combustor liner. In flowing to the very small holes in the combustor liner the air must make a second reversal and substantially all of any remaining dirt particles are caused to flow through this second group of larger holes during this reversal of air flow. Accordingly, the air reaching the very small holes is the combustor liner and being directed to the interior surface of the combustor liner for cooling thereof is substantially devoid of dirt particles and the possibility of plugging any of these very small holes is minimized.

DESCRIPTION OF THE PREFERRED EMBODIMENT

Figure 1:
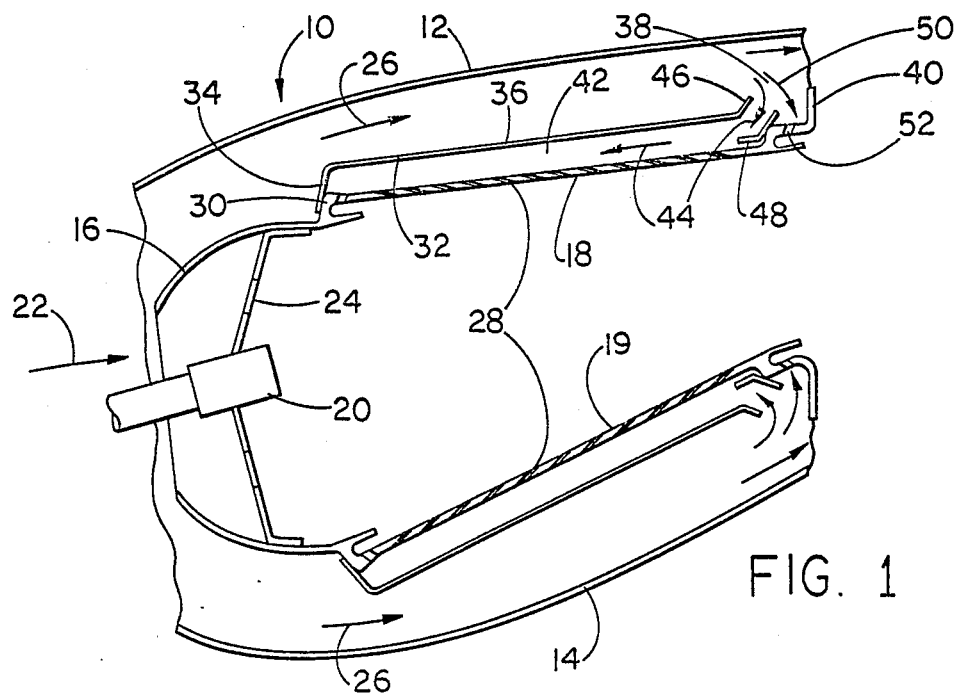
FIG. 1 is a sectional view of a portion of a gas turbine engine illustrating the combustor cooling arrangement of this invention.

Referring to FIG. 1, there is shown a portion combustion chamber of a gas turbine engine indicated generally at 10. The combustion chamber is in annular form, including an outer wall 12 and an inner wall 14, providing an annular space therebetween. Within this annular space is provided a combustor 16. The combustor 16 includes an outer liner 18 and an inner liner 19. A plurality of fuel nozzles, one of which is shown at 20, are provided at one end of the combustor for supplying fuel for burning within the combustor. Combustion air is supplied along a path 22. A portion of this air passes through openings 24 surrounding each fuel nozzle and into the interior of the combustor for mixing with the fuel and burning therein. In the usual gas turbine engine the openings 24 are provided in a swirler which imparts a swirling motion to the air so as to achieve thorough mixing with the fuel. However these details, not being part of the present invention, have been omitted in FIG. 1.

A portion of the air flowing along the entry path 22 passes around the exterior of the combustor 16, as shown by the arrows 26 in FIG. 1. The interior surface of the combustor liners 18, 19 is heated by radiation from the flame of the fuel burning in the combustor and also by convection due to flow of combustion products along the combustor wall. The air flowing past the combustor along the path 26 assists in keeping the combustor liners 18, 19 from reaching an excessive temperature. However, it has been found desirable in order to keep the combustor liner temperature within acceptable limits to provide additionally air for cooling the interior surface thereof. For this purpose holes 28 are provided in the combustor liners 18, 19 so that a portion of the air moving along the path 26 may pass through these holes and be directed substantially as a film along the interior surface of the combustor liner.

Figure 2:
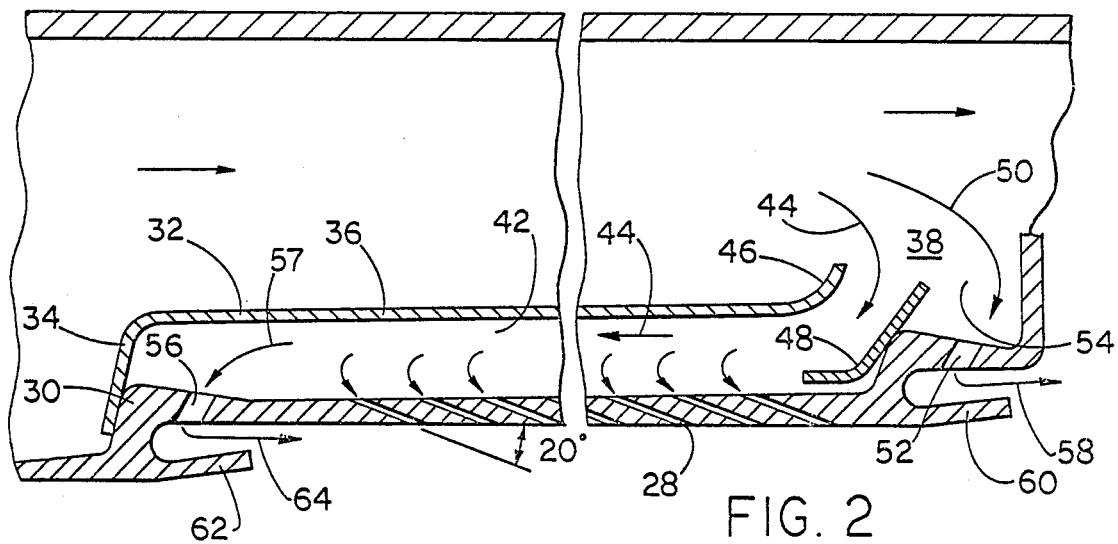
FIG. 2 is an enlarged view of a portion of the structure shown in FIG. 1, illustrating details of the invention.
Figure 3:
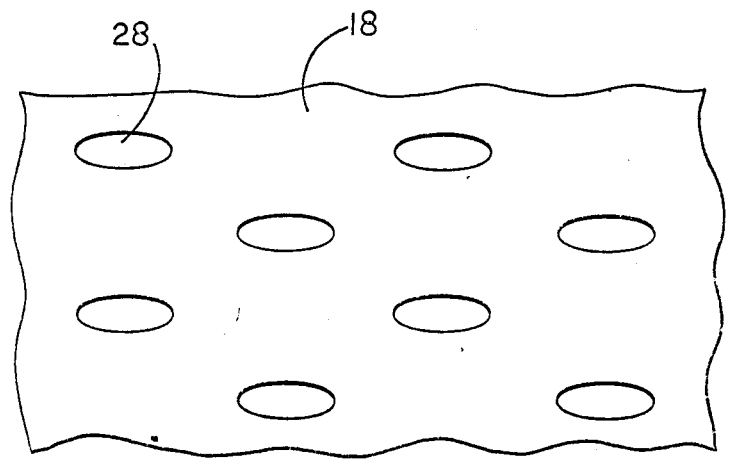
FIG. 3 is a further enlarged view of a portion of the interior surface of the combustor liner illustrating, in exaggerated form, the small holes employed in the combustor liner.

One such arrangement which provides effective cooling of the interior surface of the liner is illustrated in FIGS. 2 and 3 in enlarged, somewhat exaggerated form. This arrangement, in the structure shown in these figures, comprises a very large number of very small holes 28 drilled in the combustor liner. These holes are drilled by means of a laser and are formed at an angle of approximately 20° with the interior surface of the combustor liner 18 so that air exiting from these holes is directed largely as a film along the interior surface of the combustor liner 18 to effect cooling thereof. In one specific embodiment of the gas turbine engine the total number of holes 28 provided in the combustors of the combustion chamber is 20,000 and each of the holes has a diameter of about 0.02 inch. Because of the very large number of very small holes provided this arrangement achieves an effective and uniform distribution of cooling air over the entire surface of the combustor. However, the use of very small holes, while effective in achieving uniform cooling, involves a problem because the holes are susceptible to being plugged by dirt particles in the air flowing along the path 22. This is particularly a problem when an aircraft in which the gas turbine engine is installed operates in a dusty atmosphere, such as during taxiing and take-off. By the present invention provision is made for insuring that the possibility of plugging any significant number of these holes is substantially eliminated.

Referring now particularly to FIGS. 1 and 2, the liner 18 is formed to provide a radially extending exterior wall portion 30. A shield or blocking member 32 is mounted on the combustor at the portion 30. The shield is of L-shaped cross-section and includes a first leg 34 which is secured to the wall portion 30 of the combustor liner in any suitable manner for mounting the shield 32 in proper relationship to the combustor liner. The shield includes a second and longer leg extending in an aft direction spaced from and generally parallel to the combustor liner. This leg 36 is positioned so as to be interposed between the air flowing along the path 26 and the plurality of holes 28 formed in the combustor liner. As shown best in FIG. 2 the aft end of the leg 36 extends just beyond the last of the holes 28 formed in the combustor liner so as to prevent direct flow of air from the path 26 into and through the holes 28.

Beyond the aft end of the leg 36 there is provided a path for entrance of air into the space between the shield 32 and the exterior surface of the liner 18. While this description is directed to the flow of air relative to the liner 18, it will be clear as the description proceeds that a similar flow of air is provided relative to the liner 19. The unnecessary duplicate description has been omitted.

As shown in FIG. 2, a space 38 for flow of air is provided between the aft end of the shield 32 and a flange 40 which supports the liner 18. Because of the lower pressure in the combustor 16 compared to that in the path 26 exterior of the combustor a portion of the air flowing along the path 26 is diverted through the space 38 and is caused to flow in a reverse direction in the space 42 between the shield 32 and the exterior surface of the combustor liner, as indicated by the arrows 44. The space 38 provides an entrance for flow of air along paths as described below. In order to facilitate the guiding of the air through the entrance 38 into the reverse flow path, the aft end of the leg 36 of the shield 32 is curved, as shown at 46. For further assisting the flow of air into the reverse flow path, a flow guide 48 having a portion substantially parallel with the curved end 46 of the shield 32 is mounted on the combustor liner at a position approximately midway between the curved end 46 of the shield 32 and the flange 40. The flow guide 48 splits the entrance 38 into two sections, one for passing a portion of the air along the path indicated by the arrows 44 and the other for passing another portion of the air along a second path 50.

For the purpose of removing from the air dirt particles which might otherwise plug some of the holes 28 there are provided in the combustor liner between the end of the flow guide 48 and the flange 40 a plurality of holes 52 extending through the combustor liner. These holes are substantially larger than the holes 28 so that dirt particles which might be of a size sufficient to plug the holes 28 are removed from the air stream flowing along the path 44 into the space 42 and pass freely through the holes 52. In one specific embodiment of this invention these holes are approximately 0.05 inch in diameter compared to 0.02 inch for the holes 28. The holes 52 are provided in smaller numbers than the holes 28. In a specific embodiment of this invention there are between 400 and 500 such holes 52 in the combustion chamber compared to approximately 20,000 holes 28 in the liner 18.

As indicated best in FIG. 2, some of this diverted air is directed, as shown by the arrows 44, into the space 42 for reverse flow in the flow path provided by the space 42 between the shield 32 and the combustor liner 18. A second portion of this diverted air flows in the direction of the arrow 50 into the space 54 between the end of the flow guide 48 and the flange 40 in the direction of the holes 52. Because of the centrifugal force acting on the diverted air stream during this change of direction of the air flow the dirt particles therein, being heavier than the air, tend to follow the outer path 50 and therefore to be directed toward the holes 52. These dirt particles are thereby removed from the portion of the diverted air flowing in the direction of the arrows 44 for reverse flow in the space 42. Thus, the number of dirt particles in the air flowing in the path 44 is substantially reduced so that the air later flowing through the holes 28 is substantially free of such dirt particles, and the possibility of such particles blocking the holes 28 is minimized.

For further elimination of any residual dust particles, should that be necessary, provision is made in the applicant's invention for a second reversal of flow of the air and for the provision of a further plurality of larger holes beyond the point of such reversal. As shown in FIG. 2 the holes 28 are inclined in the aft direction so that the air flowing in a reverse direction along the path 44 in the space 42 must reverse its direction a second time in order to pass through the holes 28. The leg 34 of the shield 32 assists in effecting this second reversal of flow by blocking further flow of air along the initial reverse flow path 44 at the forward end of the space 42. In order to remove any residual dirt particles in the air flowing in the space 42 a second plurality of larger holes 56 are provided in the combustor liner adjacent the leg 34 of the shield 36. As in the case of the first reversal of air flow the second reversal of flow, occurring in the space 42 as the air is directed through the holes 28, causes the heavier dirt particles to follow a path, indicated by the arrow 57, having a larger radius so that such particles are directed beyond the holes 28 and into the holes 56, further reducing the possibility of any dirt remaining in the air passing through the holes 28.

In order to cause the air flowing through the holes 52 to be directed generally along the interior surface of the liner 18 in the direction indicated by the arrow 58 the combustor liner 18 is formed to include a flange or blocking leg 60 positioned inwardly of the openings 52 and spaced therefrom. A similar flange or blocking leg 62 is provided in a position spaced from the openings 56 so as to direct air passing through the openings 58 along the combustor liner in the general direction indicated by the arrow 64.

Thus, by the applicant's invention provision is made for blocking direct flow of air into the very small holes 28, and a portion of the air flowing past the combustor is caused to be reversed in direction before reaching the small holes 28. At the point of reversal larger holes are provided which pass the dirt particles thrown outwardly toward these larger holes during such reversal of air flow. To insure even more complete elimination of any dirt particles a second reversal of air is effected by the applicant's structure and a second plurality of larger holes are provided at a location beyond this second reversal to eliminate any residual dirt particles remaining in the air. Thus, the air ultimately reaching the small holes is substantially free of any dirt particles and the risk of plugging of any of these small holes by dirt particles is minimized.

It is claimed:

1. A gas turbine engine combustor aft of the gas turbine compressor section, said combustor comprising:
   (a) a liner disposed inwardly of a combustor outer wall and in the compressor discharge airflow, wherein the compressor discharge airflow is used for combustor cooling air and said liner is positioned for flow of cooling air past the exterior of said liner;
   (b) a plurality of small film cooling holes in said liner, said film cooling holes being inclined toward the aft end of the combustor to direct cooling air along the interior surface of said liner;
   (c) first means on said liner for blocking direct flow of air to said small film cooling holes and providing a path for reverse flow of air between said first means and the exterior surface of said liner;
   (d) second means disposed aft of said first means for diverting a portion of said air and providing reverse flow of the diverted air into said path; and
   (e) a first plurality of larger holes in said liner at the point of reversal of flow of said air for passing dirt particles therethrough.

2. The combustor as recited in claim 1 wherein said first means is a shield secured to said exterior surface of said liner forward of said small film cooling holes and extending parallel to said exterior surface to a point aft of said small film cooling holes to provide said path.

3. The combustor as recited in claim 1 wherein said plurality of small film cooling holes are substantially greater in number than said plurality of larger holes.

4. The combustor of claim 1 wherein said small film cooling holes are approximately 0.02 inch in diameter and said larger holes are approximately 0.05 inch in diameter.

5. The combustor as recited in claim 1 wherein said first means comprises a shield of approximately L-shaped cross section having a first leg fixed to said liner forward of said small film cooling holes and a second leg extending generally parallel to said liner and extending aft beyond the last of said small film cooling holes but forward of said larger holes, said first leg blocking direct flow of air to said small cooling holes and also blocking further reverse flow of air along said path and causing the direction of the air flow to be reversed a second time and the air to be directed through said small cooling holes.

6. The combustor as recited in claim 5 wherein the aft end of said shield includes a portion curved outwardly to facilitate guiding reverse flow of air into said path.

7. The combustor as recited in claim 6 and further including a curved flow guide having a portion extending generally parallel to said curved portion of said shield, said flow guide being secured to said liner at a point spaced from said aft end of said shield to provide, along with said aft end of said shield, an entrance for facilitating reverse flow of air into said path.

8. The combustor as recited in claim 7 wherein said larger holes are disposed in the aft portion of said entrance, whereby the dirt particles in said air are directed toward said larger holes during said reversal of air flow.

9. The combustor as recited in claim 5 and further including, in addition to said first plurality of larger holes, a second plurality of larger holes near said first leg for passing therethrough dirt particles in the air when the direction of flow of air is reversed the second time.

10. The combustor as recited in claim 9 wherein said combustor liner is formed to include a first flange disposed in the path of air flowing through said first plurality of larger holes and a second flange disposed in the path of air flowing through said second plurality of larger holes, said first and second flanges causing air passing through said larger holes to be directed along the interior surface of said liner.

* * * * *